Jan. 5, 1960  S. G. COHEN  2,920,316
WEIGHING ENCODER
Filed March 11, 1955  3 Sheets-Sheet 1

INVENTOR.
SAMUEL G. COHEN
ATTORNEY.

Jan. 5, 1960  S. G. COHEN  2,920,316
WEIGHING ENCODER

Filed March 11, 1955  3 Sheets-Sheet 2

INVENTOR.
SAMUEL G. COHEN
BY H. A. Mackey
ATTORNEY.

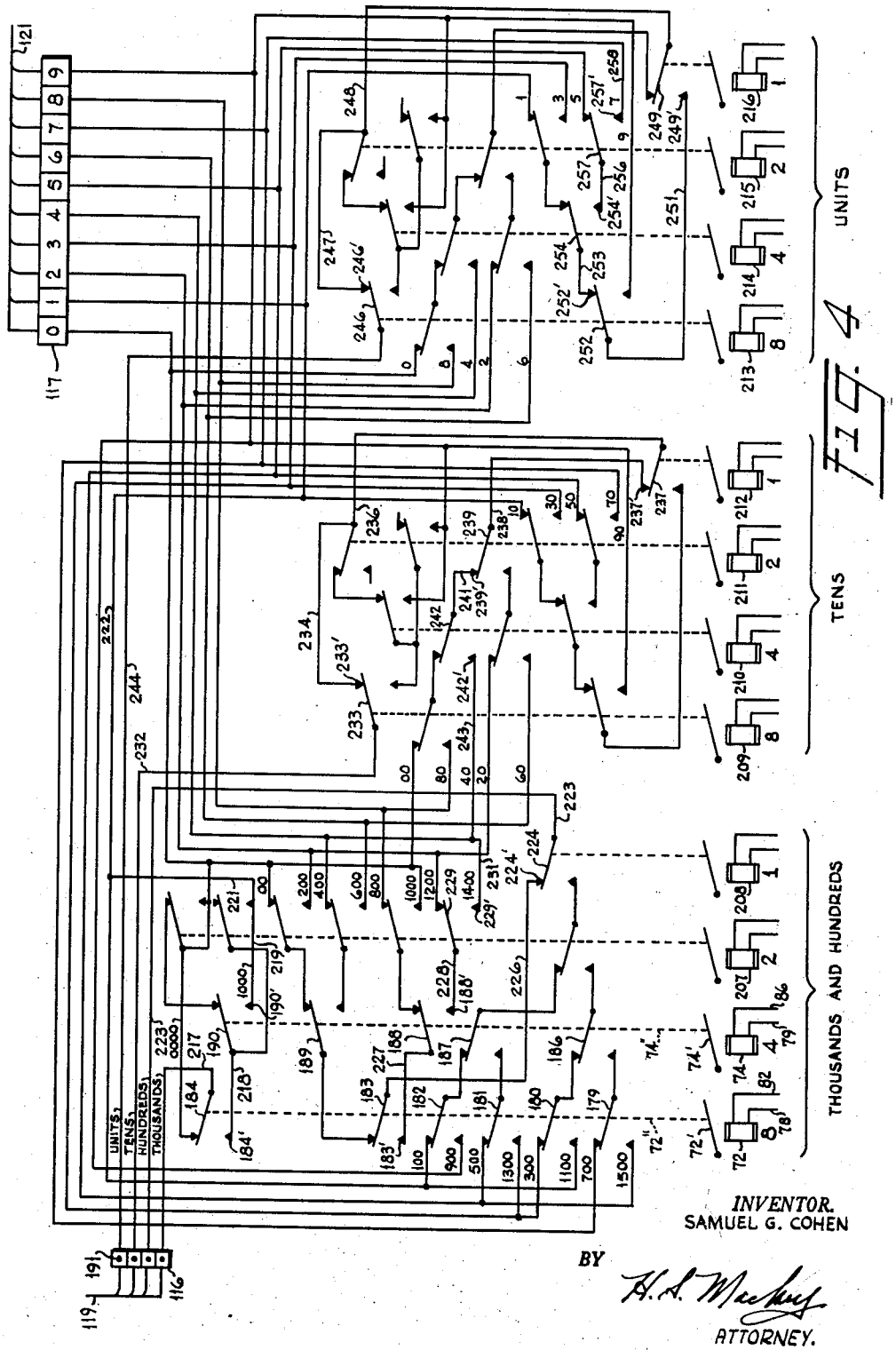

United States Patent Office 2,920,316
Patented Jan. 5, 1960

2,920,316
WEIGHING ENCODER

Samuel G. Cohen, Ossining, N.Y., assignor to General Precision Laboratory Incorporated, a corporation of New York Application March 11, 1955, Serial No. 493,732

4 Claims. (Cl. 340—347)

This invention relates to weighing encoders and decoders for converting an analog representation of a quantity to a digital representation thereof.

In this invention an electrical quality, such as a voltage or current, having an unknown magnitude or quantity consititutes the analog representation and is employed as an input signal. The encoding of this signal is a discontinuous or step operation, that is, the input quality may be said to be quantized. Magnitudes of the electrical quality are selected one after the other at short intervals either manually or automatically, and each is measured or "weighed" and its magnitude converted to its final indication or record before the next magnitude is weighed. In each of these operations the input is compared with a known quantity of voltage, current or other electrical quality of the same kind as the input signal, resulting in the selection and connection of a series of electrical components to provide the known electrical quantity of a magnitude closely matching the magnitude of the input signal. In the course of the weighing operation a number of two-position or bistable circuits are positioned and locked in accordance with the arrangement of the series of selected electrical components. These two-position or bistable circuits are provided with read-out paths by which circuits representing the digit places of any selected system of number representation are set up. The represented number can then be read out and indicated or recorded on a suitable instrument.

Weighing encoders are so termed because of the resemblance of their electrical operation to the mechanical operation of gravimetric weighing scales having two arms, in the use of which an unknown weight is placed on one arm and known weights are successively tried on the other arm until their combination equals the unknown weight. In the analogous electrical operation an unknown electrical quantity is applied to an electrical difference-sensing device to which a number of different known electrical quantities also are applied in succession. If when applying one of the known quantities, it is found to be greater than the unknown quantity, the known quantity is removed and if the known quantity is equal to or less than the unknown quantity the known quantity is effectively retained. The trial of the series of known quantities proceeds from the largest of them through successively decreasing magnitudes to the smallest known quantity, so that when the weighing operation has been completed the aggregate of the retained known quantities exactly or very nearly equals the unknown quantity.

In the course of securing the aggregate of the retained known quantities a plurality of two-position or bistable circuits are activated so that they represent the retained known quantities. These circuits may, for example, consist of current-carrying conductors each having two distinctive current carrying conditions, electromagnetic relays, bistable electronic tube units or similar transistor switching circuits.

Associated with the two-position or bistable circuits are read-out paths which, in the case of relays, may be simply relay contact closed paths. In the case of other types of bistable circuits the paths may be of more complex nature but in all cases they provide a plurality of paths representing in combination the digits of a number in some numerical system, the number having a value equal to the value of the unknown input electrical quantity. Appropriate indicating or recording devices are applied to this plurality of electrical paths to utilize the output digital representation.

The general purpose of this invention is to represent digitally an analog of an input quantity.

Another purpose of the invention is to provide an apparatus which automatically by successive and progressive trial weighing operations operates a plurality of two-state devices which convert an unknown electrical quantity into a digital recordable quantity.

A further understanding of this invention may be secured from the detailed description and associated drawings, in which:

Figure 4 is a schematic diagram of the coding relay contact circuit.

Figure 1:
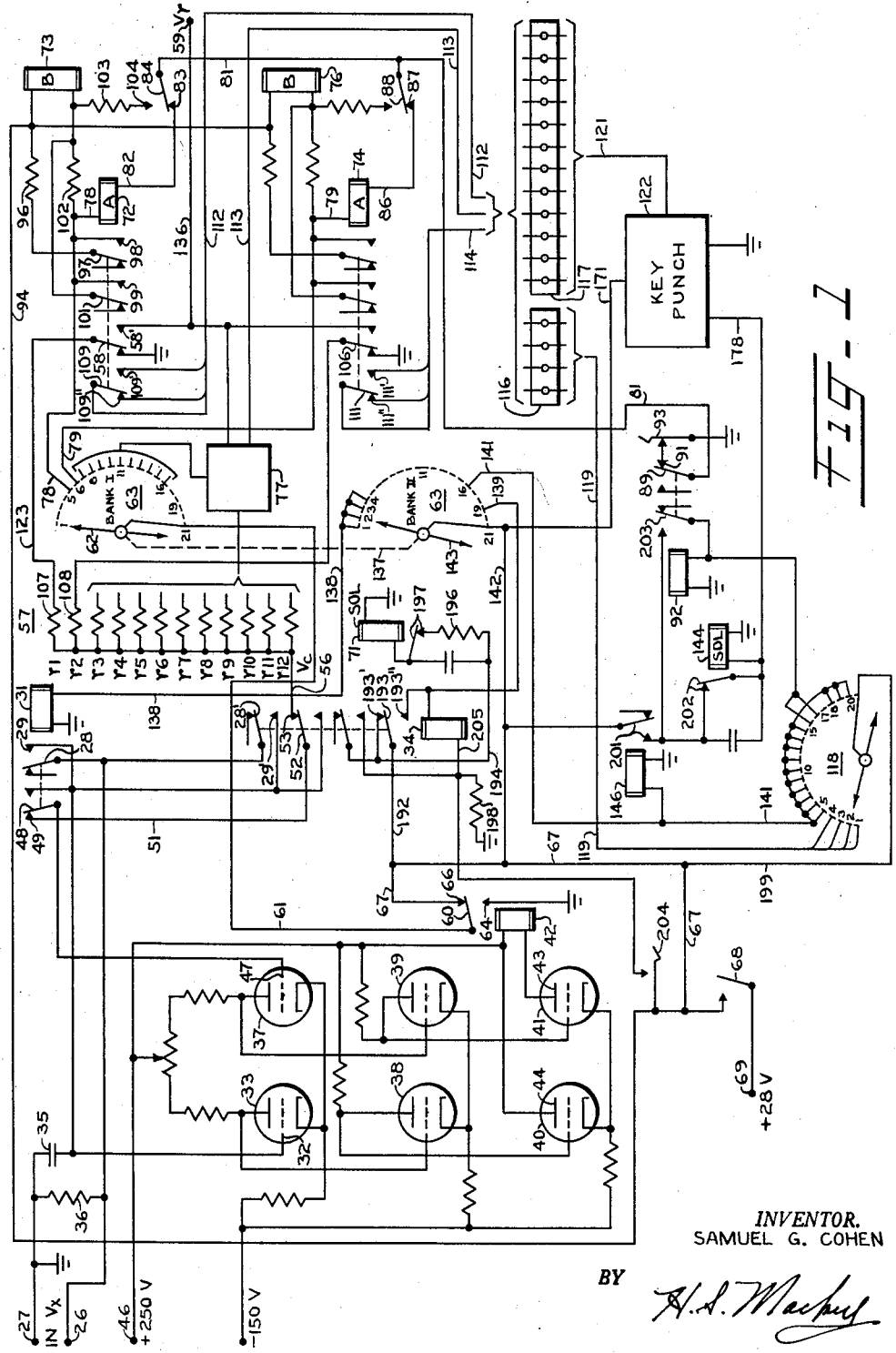
Figure 1 is a partial schematic circuit of the weighing encoder.

Referring now to Fig. 1, input signal potential $V_x$ applied between terminal 26 and grounded terminal 27 is connected through the contact armature 28 and forward contact 29 of relay 31, when operated, to the control grid 32 of a triode 33. Contact armature 28' and forward contact 29' of relay 34 are connected in shunt with armature 28 and contact 29. A capacitor 35 is connected between grid 32 and ground, and a resistor 36 is connected across the input terminals 26 and 27. The triode 33 and triode 37 comprise a differential direct-coupled amplifying stage which is followed by a second differential stage comprising triodes 38 and 39 and a third differential stage comprising triodes 40 and 41. The coil of a relay 42 is connected between the anode 43 of triode 41 and the anode 44 of triode 40, the latter anode also being connected directly to a positive potential source represented by terminal 46. The other control grid 47 of the first stage is connected through an armature 48 and back contact 49 of relay 31, conductor 51, armature 52 and back contact 53 of relay 34, and conductor 56 to a comparison potential $V_c$ derived from a bank of twelve weighing resistors 57. The individual resistors of the weighing resistor bank are connected to relay contact arms, such as armature 58, through which they may be connected individually either to ground or to a source of reference potential $V_r$ represented by terminal 59.

The single contact armature 60 of relay 42 is connected through conductor 61 to the contact 21 and armature 62 of bank I of a two-bank step switch 63. The front contact 64 of relay 42 is grounded and the back contact 66 is connected through conductor 67 and through power switch 68 to a grounded source of direct current, conveniently 28 volts, represented by terminal 69. Bank I of step switch 63 contains 21 fixed contacts, the 21st being connected to the stepping contact 62. Stepping contact 62 is capable of continuous clockwise step movement under control of the solenoid 71, and makes contact simultaneously with contacts 21 and 1.

The apparatus is provided with 24 coding relays grouped in 12 generally similar pairs, each pair consisting of an A relay and a B relay. Two pairs, the first consisting of A and B relays 72 and 73 respectively, and the second pair consisting of A and B relays 74 and 76 respectively, are shown in full with their associated circuits. The other ten relay pairs, which are duplicates of those illustrated in detail, are indicated generally by the rectangle 77 for the purpose of simplicity. In each relay pair one A relay coil terminal is connected to its own step terminal of step switch 63, bank I, commencing with step 5, which is connected through conductor 78 to A relay 72. Step 6 is connected through conductor 79 to relay 74 and the remaining steps to and including step 16 are connected to the remaining ten A relays. The other coil terminal of each A relay is connected through a B relay contact to a grounded reset bus 81. For example, terminal conductor 82 of relay coil 72 is connected to the back contact 83 of B relay 73, from which connection is made through contact armature 84 to bus 81. Similarly, conductor 86 or relay coil 74 is connected to the back contact 87 of B relay 76, thence through armature 88 to bus 81.

The A and B relays of each pair are electrically interlocked so that only one at a time can be in the operated condition. Thus, when potential is applied to terminal conductor 78 of A relay 72, its pull-up path is through conductor 82, back contact 83 of B relay 73, and contact armature 84 to bus 81 grounded through the armature 89 and back contact 91 of relay 92 and the normally closed contacts of reset switch 93. When A relay 72 operates it locks itself closed through conductor 94, resistor 96, armature 97, forward contact 98 and conductor 78. Upon application of ground to conductor 78, releasing A relay 72, the B relay 73 receives its initial operating impulse from conductor 78 through forward contact 99 of the A relay 72 and armature 101. When this contact opens, ground is maintained on the B relay 73 through resistor 102. The B relay 73 locks itself closed through low resistor 103, forward contact 104 and armature 84. On again applying potential to conductor 78, B relay 73 is not released and relay 72 is not able to be operated.

The contact arms 58 and 106 of A relays 72 and 74 respectively control respective resistors 107 and 108 of the resistor bank 57. Similar contact arms of the other 10 A relays control the other 10 resistors. Each A relay also has from one to five additional contact armatures, each with a front and back contact used to read out the output signal of this instrument in decimal digital code form as will more clearly appear hereinafter. These contact arms are exemplified by contact arm 109 of A relay 72, with front and back contacts 109' and 109", and contact arm 111 with front and back contacts 111' and 111" of A relay 74. All of these read-out contacts together with similar read-out contacts of the other ten "A" relays represented in rectangle 77, are connected through cabled conductors 112, 113 and 114 to two terminal blocks 116 and 117, and will be further described in connection with Fig. 4. Terminal block 116 is connected to a second rotary switch 118 by means of a 4-conductor cable 119, and terminal block 117 is connected through a 12-conductor cable 121 to key punch 122 employed as a read-out device.

The weighing resistor bank 57 consists of twelve resistors of graduated size. One end of each resistor is connected to the common conductor 56 and the other ends of the twelve resistors are connected to the twelve A relay contacts as indicated by the connection of the first resistor 107 through conductor 123 to the contact arm 58 of A relay 72 and the connection of the second resistor 108 to the contact arm 106 of a A relay 74. By the operation of the several A relays the resistors are connected either to ground or to the reference potential terminal 59.

Figure 2:
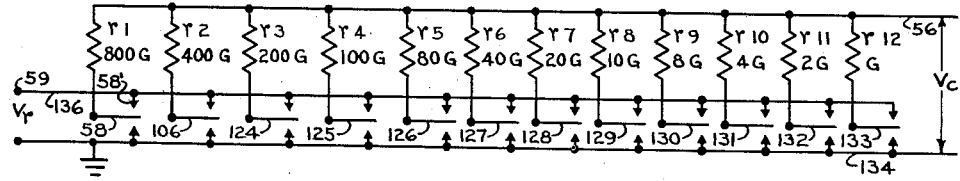
Figure 2 is a schematic circuit of the weighing resistor bank together with connected relay contacts.

The weighing resistor circuit is more clearly shown in Fig. 2, in which the twelve resistors $r_1$ to $r_{12}$ represent the resistors indicated in the resistor bank 57, Fig. 1, and the two-position switch arms 58 and 106, Fig. 2, represent the relay contact arms, similarly numbered, of Fig. 1. The remaining ten switch arms 124–133 inclusive, Fig. 2, represent corresponding contact arms of A relays indicated by the rectangle 77, Fig. 1. All of the normal or unoperated contacts are grounded to bus 134, Fig. 2, and all of the front or operated contacts, such as contact 58', are connected through bus 136 to reference potential terminal 59, Figs. 1 and 2. It may be shown that the output voltage $V_c$, between bus 56 and ground, is a fraction of the input voltage, $V_r$, depending on the number of switches or relay contact arms thrown to the potential bus 136. Its exact value is most easily expressed in terms of the conductances of the network elements, rather than of their resistances.

In this embodiment of the invention the binary-coded decimal system of numbers is chosen for use in designing the weighing resistors and their associated relays, while the relay read-out contacts are connected to express the output in the conventional decimal system. Alternatively, any other system may be employed instead. In employing the binary decimal system, the values of the resistors in resistor bank 57, expressed in conductance units, are made to vary within each group of four resistors by a factor of two, the least counts or smallest conductances of successive groups being made to vary by a factor of ten. If, for example, the conductance of the resistor at the extreme right is G, then the conductances of the other resistors, progressing toward the left, are 2G, 4G, 8G, 10G, 20G, 40G, 80G, 100G, 200G, 400G and 800G. As will be shown in more detail hereafter, the conductances 800G, 400G, 200G and 100G are employed to encode in binary form the hundreds and a limited portion of the thousands digital values in the decimal system of the input quantity; the 80G, 40G, 20G and 10G conductances are employed to encode the tens value; and the 8G, 4G, 2G and G conductances are employed to encode the units place value.

It may be shown that, in any group of resistors so connected, the resistors having any desired conductances $G_1$, $G_2$, etc., the output voltage $V_c$ is $$V_c = \frac{E_1G_1 + E_2G_2 + E_3G_3 + \ldots}{G_1 + G_2 + G_3 + \ldots} \qquad (1)$$

in which $E_1$, $E_2$, etc., are the voltages applied to the conductances. In the present case $E_1$, $E_2$, etc., are either $V_r$ or zero, depending upon relay position. It is obviously possible, therefore, to make the total conductance of a group of 12 conductances progressing by the binary decimal rule have any value between G and about 1600G, and to make $V_c$ have any value between a function of $V_r$ and 1/1600 thereof, progressing by steps corresponding in size to the resistor of lowest conductance. Obviously the accuracy of this device increases as the number of resistors is increased, but accuracy also depends upon the accuracy with which the value of the reference potential is maintained.

Bank II of step switch 63, Fig. 1, is mechanically connected to rotate with bank I as indicated by the dashed line 137. The first four steps of bank II are connected through conductor 138 to operate relay 31 and step 19 is connected through conductor 139 to operate relay 34. Step 16 is connected through conductor 141 to start a key punch when that type of card punching machine is employed as the recorder of the output of the instrument. It is to be understood, however, that this invention is applicable for use in connection with any type of recording instrument or machine, and in particular in connection with any type of card punching machine. A positive potential is connected through conductors 67 and 142 from power switch 68 to step 21 and the arm 143. The bank of the second step switch 118, with its solenoid 144 and relays 146 and 92, comprise the key punch read-out circuit within the instrument of the invention. Connections from the four terminals of terminal block 116 are cabled through cable 119 to the first four fixed contacts numbered 1, 2, 3 and 4 of rotary switch 118.

The function of the key punch as a read-out signal recorder is to punch a card with holes decimally representing a number. A representative key punch employs a card having a large number of identical columns of figures, each column consisting of the ten digits of the decimal system from 0 to 9 in increasing order from top to bottom. The key punch, by punching out a number in a column, indicates a digit, and by punching successive columns indicates digits in successive decimal positions.

Figure 3:
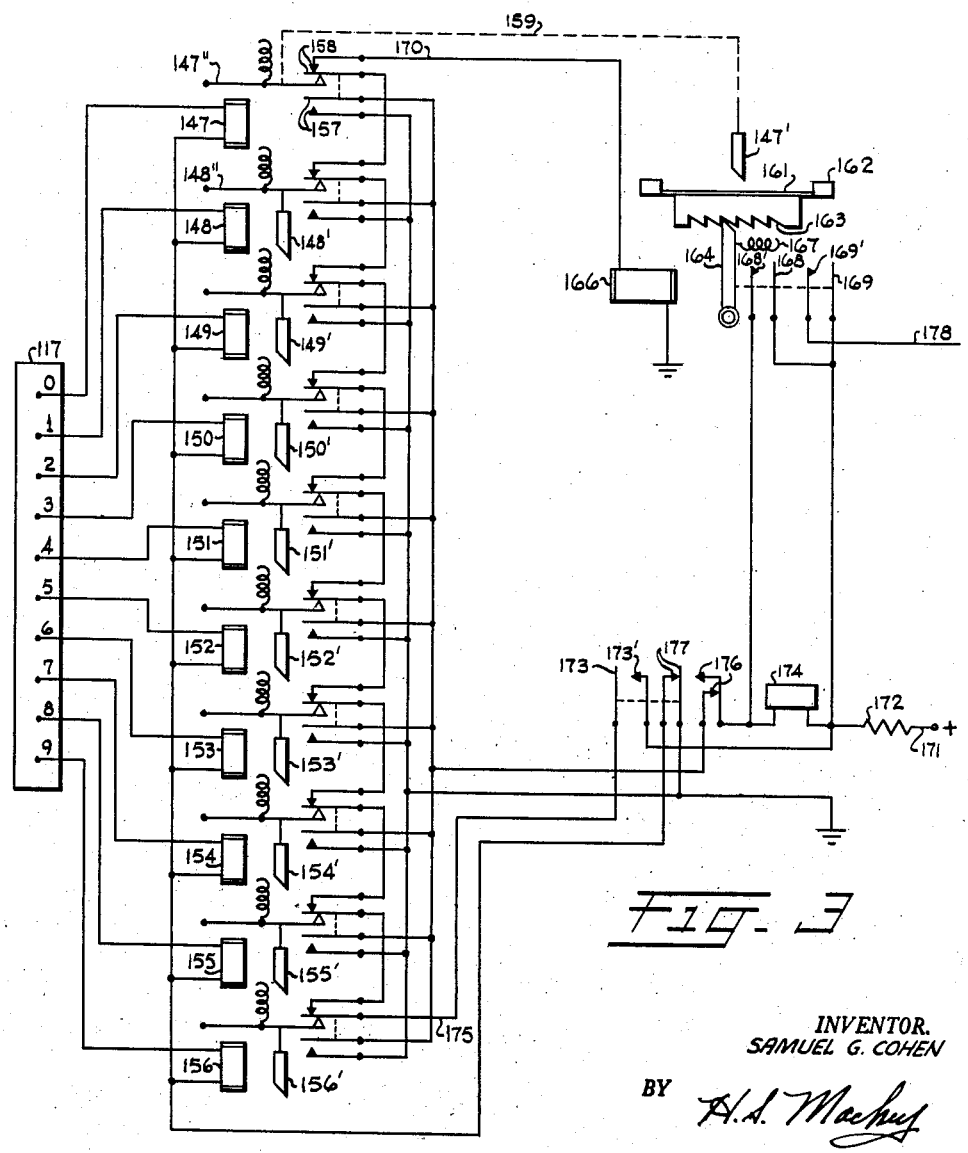
Figure 3 is a schematic diagram of a key punch circuit.

A circuit of a key punch is indicated in Fig. 3, in which ten solenoids 147–156 operate punches 147'–156' to punch the digital characters from zero to nine respectively. Each punch is swung from a punch lever, such as levers 147" and 148", which also operates a normally open pair of contacts, such as contacts 157, and a normally closed pair of contacts such as contacts 158. The punches are depicted as swung from their respective levers with the exception of punch 147', which is drawn apart for clarity and connected with its lever 147" by a dashed line 159 to indicate the mechanical connection.

The punch 147' is suspended above a punch card 161 secured to a platen 162. Actually, however, not only punch 147' but also all of the other nine punches as well are ranged closely side by side in a line over a column of card 161, so that by operating one of the punches the corresponding digit of the card is punched. The platen 162 is provided with a rack 163 for advancing the card toward the left to bring successive columns under the punches. The rack 163 is advanced by a pawl 164 operated by a pawl solenoid 166 and retracted by a spring 167. The pawl is provided with two normally open contact pairs 168/168' and 169/169'.

All of the ten normally-closed contacts of the punch levers, such as contact pair 158, are connected in series with each other and through conductor 170 with the pawl-operating solenoid 166. They are also connected to direct current supply conductor 171 through a protective resistor 172, the normally open contacts 173/173' of a relay 174, and conductor 175. The ten normally-open contacts carried by the punch levers are connected in parallel and to power in series with the relay coil 174 and its make-before-break contacts 176. The other side of the paralleled contacts is grounded. The punch solenoids 147–156 are grounded on one side through normally closed relay contacts 177. The other terminal of each coil is connected to one terminal of the ten-terminal strip 117, these ten conductors being designated as cable 121 in Fig. 1. One normally open contact pair 168/168' of the pawl 164 is connected in shunt with the relay coil 174. The other contact pair 169/169' of pawl 164 is connected to apply power from conductor 171 through conductor 178 to rotary switch solenoid 144, Fig. 1.

The read-out contacts of the A relays typified by contacts 109 and 111 of Fig. 1 are connected as shown in Fig. 4, in which the A relay coil 72, with terminal conductors 78 and 82, is shown with its magnetic armature 72'. It is connected by a dashed line 72" with contact armatures 179, 180, 181, 182, 183 and 184, all of which are connected for read-out and are typified by the single contact armature 109 in Fig. 1 as a matter of schematic abbreviation. Similarly, relay coil 74, Figs. 1 and 4, having terminal conductors 79 and 86, is illustrated in Fig. 4 with its magnetic armature 74' mechanically connected as indicated by dashed line 74" with its contact armatures 186, 187, 188, 189 and 190. The other ten A relays are similarly depicted in Fig. 4 with their associated contacts. The relay contact circuits all terminate on two terminal boards 116 and 117, the former having four terminals designated by the terms units, tens, hundreds and thousands; and the latter having ten terminals designated by the names of the decimal system digits.

When any relay combination has been actuated, four continuous circuits exist through the contacts as shown in Fig. 4. The first circuit is from the units terminal 191 of the decimal place terminal block 116 to one of the ten decimal digits on the digit terminal block 117. Then second circuit is from the tens terminal of block 116 to the source or another terminal of terminal block 117, and third and fourth circuits are from the hundreds and thousands terminals of block 116 respectively to a terminal on terminal block 117. These four circuits are effectively independent in operation because connections are made from external components to the four terminals of block 149 consecutively in time and not simultaneously. As an example, if the circuits be traced as drawn in Fig. 4, all relays being normal, it will be found that the circuit starting at unit terminal 191 ends at the zero digit terminal of block 117, and that each of the other three circuits starting at the tens, hundreds and thousands terminals respectively of block 116, ends also at the zero digit terminal of block 117.

The left-hand group of four relays for the thousands and hundreds decimal places differs from the other two groups of relays in that all of the relays may be operated singly or in any combination to produce any value (in hundreds) from zero to 15. The other two groups are restricted in operation to an input signal representing zero to 9 merely by the fact that if the input signal be equal to or more than the least count of the next higher group, it will register there. In addition, these two lower groups have no facilities for reading out more than 9.

The weighing operation is best understood in its entirety by a numerical example. Let a potential, $V_x$ of 86.907 volts be applied between the input terminals 26 and 27, Fig. 1. This requires for balance a potential, $V_c$, of the same amount. In order to ascertain which of the 12 resistors of bank 57 should be inserted to produce the potential $V_c$, using a reference potential $V_r$, Equation 1 is employed. In it quantities are substituted representing the conductance values of the resistors Fig. 2, and for $E_1$, $E_2$ etc., inserting either $V_r$ or zero. That is, $$V_c = \frac{xGV_r}{800G + 400G + \ldots + G} \quad (2)$$

in which $xG$ represents the sum of all conductances in circuit, the remainder being grounded. Adding the denominator and cancelling $G$, $$V_c = \frac{xV_r}{1665} \quad (3)$$

The ratio $x/1665$ is the ratio of the conductances in circuit to all 12 conductances. Solving for $x$, which is the nondimensional sum of all conductances in circuit, $$x = 1665 \frac{V_c}{V_r} \quad (4)$$

If the assumed value for $V_c$ of 86.907 volts be inserted and a value of 100 volts be selected for $V_r$, then $x = 1447$, or dimensionally $1447G$. Now, selecting the conductances beginning at the left in Fig. 2, conductances $800G$, $400G$ and $200G$ in the thousands and hundreds group add to 1400, conductance $40G$ contributes 4 in the tens place, and the sum of conductances $4G$, $2G$ and $G$ in the units group contribute 7 in the units place or a total of the desired 1447. These conductances then should be in circuit in this example, so that their associated contact armatures 58, 106, 124, 127, 131, 132 and 133 should be in the "up" position, connecting their conductances to the $V_r$ bus 136. The remaining armatures 125, 126, 128, 129 and 130 are in the "down" position, connecting their associated conductances to the ground bus 134.

In the complete operation of the weighing encoder, after connecting the input signal circuit to input conductors 26 and 27, Fig. 1, the power switch 68 is closed. Normally step switch 63 rests on step 19 between cycles. However, if it should be on any other step at this time, such as step 20, the step switch will immediately be operated. The circuit for operating step switch 63, is traced from the power switch 68 through conductor 67, conductor 192, relay contact armature 193, back contact 193', conductor 194, resistor 196, rotary switch stepping contacts 197, solenoid 71, and to ground. Step switch 63 is stepped by its solenoid 71 and continues to step until it reaches step 19, when current is taken from the power switch 68 and conductor 67 through conductor 142, step switch rotary armature 143, step contact 19, conductor 139, relay coil 34, and resistor 198 to ground, operating relay 34. This breaks connection between relay contacts 193 and 193', releasing solenoid 71 and stopping the step switch 63 on its step 19. When relay 34 is operated, it locks itself closed, drawing power from power switch 68 through conductor 67, conductor 192, contact armature 193 and forward contact 193'', through coil 34 and resistor 198 to ground.

Step switch 118 normally rests on step 17 between cycles. However, if it should be on another step, such as step 18, when power switch 68 is closed power flows through power switch 68, conductor 67, conductor 199, step 18 and conductor 141 to relay 146 and ground. Relay contacts 201 close, applying power to stepping solenoid 144 through its self-stepping contacts 202. Step switch 118 accordingly steps to step 21 and makes contact with step one. Relay 146 is released, power flows through step one, cable 119, contacts of the unoperated A relays and cable 121 to a key punch magnet which in this case is the zero digit magnet 147, Fig. 3. As described in connection with Fig. 4, the path from cable 119 through the several relay contacts to cable 121, the zero solenoid 147, Fig. 3, and ground is continuous.

Punch solenoid 147 operates, punching the zero digit in the leftmost card column. Punch contacts 157 close, operating relay 174 which locks closed through contacts 176/177. Contacts 177 open, breaking the circuit of punch magnet 147, which releases, closing its contacts 158. This closes the circuit of the ratchet solenoid 166 through contacts 173/173' of the relay, and pawl 164 operates, advancing the card 161 to its next column. At the same time pawl contacts 169/169' close, applying current through conductor 178 to actuate solenoid 144, Fig. 1 and advance rotary switch 118. Pawl contacts 168/168' also close, shunting relay coil 174 and causing it to open. This opens contacts 173/173' which releases solenoid 166, and pawl 164 drops back under the influence of its retractile spring 167. This releases pawl contacts 169/169', permitting solenoid 144, Fig. 1, to release and permitting step switch 118 to complete its step to step contact 2. On this step and on steps 3 and 4 the same operations occur, causing the step switch to step to step contact 5. This operates relay 146, causing the switch to step ahead as described to step 15, when it closes the reset relay 92. This momentarily opens contact arm 89, resetting all A and B coding relays which are not in their normal position of operation. Contact arm 203 is also closed, applying power to the solenoid 144 and stepping the step switch 118 to step 17, when the reset relay 92 again opens. At this time, all relays are in their normal condition excepting relay 34 which is locked in its operated position, and the circuit is ready to commence operation.

To start the automatic operation of the circuit the momentary contact start switch 204 is closed for an instant. This applies power to terminal conductor 205 of relay 34, shunting its coil and releasing the relay. Relay armature 193 applies power to the step switch 63 solenoid 71 through its stepping contacts 197 and the switch thereupon steps around all of its contacts until it again reaches contact 19, when it operates relay 34 and stops. The step switch makes its circuit in about 0.6 second, and during this time all of the remainder of the instrument operation occurs. When step switch 63, in the course of its operation steps to steps 21 and one, relay 31 is operated and remains operated for four steps. During this period of relay closure the contact arm 48 connects the two control grids 32 and 47 of the balanced stage, equalizing their voltage and thus improving the accuracy of subsequent operation. The operated contact arm 28 of relay 31 connects the signal input terminal 26 to the input grid 32 and input signal storage condenser 35. This condenser is thus charged by the input signal potential during the passage of the first four steps of the step switch 63 and is then disconnected from the input terminal by release of relay 31. It is therefore desirable that the time constant of this condenser and the input circuit be short enough to allow substantially complete charging during the contact of arm 28. However, more accurate operation with input circuits of high impedance is secured by paralleling the contacts 28 and 29 of relay 31 with contacts 28' and 29' of relay 34. Then, in non-automatic operation when step switch 63 may be permited to dwell on step 19 for long periods, and in automatic operation in which increased dwelling is provided for, the closed contacts 28'—29' connect the input terminal 26 to condenser 34 for longer times.

When the step switch 63 steps to its contact 5, relay 31 is released and the potential obtained by condenser 34 is thereby isolated from the input terminal 26, but remains effective on the input grid 32 during the remainder of the cycle. The reference grid 47 is connected through contact arm 48, back contact 49, conductor 51, contact arm 52, back contact 53 and conductor 56 to the weighing resistor bank 57. Since at this time all of the weighing resistors 57 are connected to ground through their A relay contacts, the potential $V_c$ on grid 47 is zero and therefore less than the potential on grid 32. The operation of the balanced amplifier comprising triodes 33, 37, 38, 39, 40 and 41 is then such as to permit relay 42 to remain normal. Power therefore flows from conductor 67 through contact arm 60 and conductor 61 to step 5 of bank I of step switch 63. From step 5 power flows through conductor 78, the A relay 72, conductor 82, contacts 83/84 of the B relay 73, conductor 81, contact arm 89 of relay 92, and manual reset switch 93 to ground. Relay 72, operating, locks itself closed through conductor 94, resistor 96 and contacts 97/98. The relay 72 also applies the reference potential $V_r$ from terminal 59 through conductor 136 and contacts 58/58' to the first and smallest resistance resistor 107, thus applying a large step of potential to the potential bus 56 and to reference grid 47.

If the potential applied to reference grid 47 is less than that on grid 32 nothing more happens and, when the step switch 63 leaves step 5, the relay 72 remains locked closed and retains potential on resistor 107. If, however, the potential applied to grid 47 is greater than that on grid 32, relay 42 operates, applying ground through forward contact 64, contact arm 60, conductor 61 and step 5 to relay 72, releasing it. Meanwhile and before release of relay 72 ground is also applied through contact arm 101 to relay 73, operating it. If during this operation contact arm 101 should open, the closure of relay 73 will be continued through resistor 102. The operation of relay 73 closes contact arm 84, locking the B relay 73 closed and locking the A relay 72 open.

The result is, that at the time the step relay 63 steps from five to six, the A relay 72 is left closed and locked, maintaining resistor 107 in circuit, if the reference potential $V_r$ was less than the unknown potential $V_x$. However, if when the switch steps from five to six $V_r$ was greater than $V_x$, then the B relay 73 was left closed and locked with the resistor 107 removed from the circuit.

While the step switch 63 is on step 6 exactly the same procedure occurs to connect resistor 108 of bank 57 into the circuit or to leave it grounded, with either the A relay 74 or the B relay 76 locked closed, the operation of these relays and of relay 42 being as described in connection with relays 72 and 73. Thus in each pair of A and B relays, as the step switch 63 steps bank I from five to sixteen, either the A relay or the B relay is locked and the other is released with corresponding selection of the twelve resistors in the resistor bank 57. Since each resistor successively tried is less in conductance than the preceding one, at each operation the voltage $V_c$ applied to grid 47 becomes closer and closer to the unknown voltage $V_x$ applied to grid 32, until at the end of the cycle the two voltages are closely similar or possibly identical.

When bank II of step switch 63 arrives at step 16 it starts the operation of the key punch which then proceeds to completion in the manner which has already been described. Step switch 63 meanwhile steps to step 19 and stops as before stated. The key punch through internal automatic mechanism, well understood and practiced in the art, resets itself, ejects the punched card and lays a fresh card on its platen.

At the end of the operation of switch 63 when it has come to rest on step 19, all A relays will be either closed or normal. If, for example, the same binary decimal number 1447 be used to describe their condition then, referring to Fig. 4, A relays 72, 74, 207, 210, 214, 215 and 216 will be operated with their respective armatures down, and the remaining relays 208, 209, 211, 212 and 213 will remain normal, with their associated B relays operated. Four and only four circuits now exist through the relay read-out contacts, as follows:

From the thousands terminal on terminal block 116 through conductor 217, contacts 184/184', conductor 218, contacts 190/190', conductor 219, conductor 221, conductor 222 to terminal 1 on block 117.

From the hundreds terminal on block 116 through conductor 223, contacts 224/224', conductor 226, contacts 183/183', conductor 227, contacts 188/188', conductor 228, contacts 229/229', and conductor 231 to terminal 4 on block 117.

From the tens terminal on block 116 through conductor 232, contacts 233/233', conductor 234, conductor 236, contacts 237/237', conductor 238, contacts 239/239', conductor 241, contacts 242/242', and conductor 243 to terminal 4 on block 117.

From the units terminal on block 116 through conductor 244, contacts 246/246', conductor 247, conductor 248, contacts 249/249', conductor 251, contacts 252/252', conductor 253, contacts 254/254', conductor 256, contacts 257/257', and conductor 258 to terminal 7 on block 117. Thus the number 1447 is selected by proper actuation of the several relays and it will be obvious that under other balance conditions other binary decimal numbers are similarly selected.

What is claimed is:

1. A weighing encoder for determining the value of an unknown potential comprising, a plurality of resistors of progressively increasing resistances having one terminal connected in common, a source of known potential, a plurality of relays, each of said relays including contact means connecting a terminal of a respective resistor remote from said common terminal to said source of known potential in one state of operation of a respective relay and grounding said remote terminal in the other state of relay operation, whereby the potential existing at any instant of time at the common terminal of said resistors constitutes a sum of preselected fractions of said known potential the total of which depends on the number and value of the resistors then connected to said source of known potential, a differential amplifier having said unknown potential and the potential existing at the common terminal of said resistors impressed on respective ones of a pair of inputs thereof, means for sequentially operating each of said relays to its one state for applying progressive decreasing fractions of said known potential to the common terminal of said resistors, means operated by the output of said differential amplifier for retaining a respective relay in its one state when the unknown potential exceeds the potential then existing at the common terminal of said resistors and for reoperating a respective relay to its other state when the potential of said common terminal exceeds said unknown potential, and contact means associated with each of said relays for indicating the final total potential impressed on the common terminal of said resistors.

2. A weighing encoder for determining the value of an unknown potential comprising, a plurality of resistors of progressively increasing resistances having one terminal connected in common, a source of known potential, a plurality of relays each of which includes contact means connecting a terminal of a respective resistor remote from said common terminal to said source of known potential in one state of operation of a respective relay and grounding said remote terminal in the other state of relay operation, whereby the potential existing at any instant of time at the common terminal of said resistors constitutes a sum of preselected fractions of said known potential the total of which depends on the number and value of the resistors then connected to said source of known potential, a differential amplifier having said unknown potential and the potential existing at the common terminal of said resistors impressed on respective ones of a pair of inputs thereof, a step switch having respective fixed contacts connected in circuit with respective ones of said relays, said step switch including a movable contact successively applying a potential to successive ones of said relays to progressively operate said relays to their one state, means operated by the output of said differential amplifier for maintaining the potential applied to a respective relay at a level to retain the relay in its one state when the unknown potential exceeds the potential then existing at the common terminal of said resistors and for altering the level of the applied potential and reoperating a respective relay to its other state when the potential of said common terminal exceeds said unknown potential, and means operated by said step switch for reading out the final total of the potential applied to the common terminal of said resistors.

3. A weighing encoder for determining the value of an unknown potential comprising, a plurality of resistors of progressively increasing resistance having one terminal connected in common, a source of known potential, a plurality of relays equal in number to the number of said resistors, each of said relays including contacts connecting the terminal of a respective resistor remote from said common terminal to said source of known potential in the energized condition of a respective relay and grounding said remote terminal in the deenergized condition of relay operation, whereby the potential existing at any instant of time at said common terminal constitutes a totality of preselected fractions of said known potential determined by the particular relays then energized, an energizing circuit for said relays including means for sequentially applying an operating potential to successive ones of said relays, a differential amplifier having said unknown potential and the potential existing at said common terminal impressed on respective ones of a pair of inputs thereof, an operating relay connected in the output of said differential amplifier, said operating relay including contacts normally completing said energizing circuit and being operative when the potential existing at said common terminal exceeds said unknown potential to interrupt said energizing circuit whereby the then energized relay of said plurality of relays is returned to its unenergized condition, and means operated by the relays retained in their energized condition for indicating the value of said unknown potential.

4. A weighing encoder for determining the value of an unknown potential comprising, a plurality of resistors of progressively increasing resistances having one terminal connected in common, a source of known potential, a first relay set comprising a plurality of relays equal in number to the number of said resistors, each of said relays including contacts connecting the terminal of a respective resistor remote from said common terminal to said source of known potential in the energized condition of a respective relay and grounding said remote terminal in the deenergized condition of relay operation, whereby the potential existing at any instant of time at said common terminal constitutes a totality of preselected fractions of said known potential determined by the particular relays then energized, a step switch having a plurality of fixed contacts individual ones of which are connected to individual ones of said relays, a differential amplifier having said unknown potential and the potential existing at said common terminal impressed on respective ones of a pair of inputs thereof, an operating relay connected to the output of said differential amplifier, said operating relay being provided with contact means supplying an energizing potential to a movable contact of said step switch when said unknown potential exceeds the potential at said common terminal and grounding said movable contact when the potential existing at said common terminal exceeds said unknown potential, a second relay set comprising a plurality of relays equal in number to the number of relays in said first relay set, means for energizing individual ones of the relays of said second relay set by operation of said operating relay contact means to grounding condition, means operative by energization of individual ones of the relays of said second relay set to interrupt the energization circuits of individual ones of the relays of said first relay set, and means operated by the relays of said first relay set retained in energized condition indicating the value of said unknown potential.

References Cited in the file of this patent

UNITED STATES PATENTS

| | | |
|---|---|---|
| 2,630,481 | Johnson | Mar. 3, 1953 |
| 2,738,504 | Gray | Mar. 13, 1956 |
| 2,762,038 | Lubkin | Sept. 4, 1956 |
| 2,775,754 | Sink | Dec. 25, 1956 |
| 2,784,396 | Kaiser | Mar. 3, 1957 |
| 2,869,115 | Doleman | Jan. 13, 1959 |

OTHER REFERENCES

Perley: "Automatic Strain-Gage and Thermocouple Recording on Punched Cards," Journal of the Association for Computing Machinery, vol. 1, No. 1, pages 36–43, January 1954.